United States Patent [19]
Bishop, Jr. et al.

[11] Patent Number: 5,509,004
[45] Date of Patent: Apr. 16, 1996

[54] COMMUNICATION METHOD AND NETWORK WITH MULTIPLE DYNAMIC INTRASWITCHING

[75] Inventors: James W. Bishop, Jr.; Peter J. Armbruster, both of Chandler, Ariz.

[73] Assignee: Motorola, Inc., Schaumburg, Ill.

[21] Appl. No.: 283,415

[22] Filed: Aug. 1, 1994

[51] Int. Cl.$^6$ .............................. H04L 12/64; H04L 12/66
[52] U.S. Cl. .............................. 370/54; 370/68.1; 370/79; 370/97
[58] Field of Search .................. 370/58.1, 58.2, 370/58.3, 16, 60, 60.1, 94.1, 94.2, 97, 68.1, 110.1, 54, 79; 340/827

[56] References Cited

U.S. PATENT DOCUMENTS

| | | | |
|---|---|---|---|
| 5,016,243 | 5/1991 | Fite, Jr. | 370/16 |
| 5,060,140 | 10/1991 | Brown et al. | 364/200 |
| 5,182,744 | 1/1993 | Askew et al. | 370/16 |
| 5,182,750 | 1/1993 | Bales et al. | 370/16 |
| 5,189,662 | 2/1993 | Kleine-Altekamp | 370/16 |
| 5,195,090 | 3/1993 | Bolliger et al. | 370/94.1 |

*Primary Examiner*—Wellington Chin
*Attorney, Agent, or Firm*—Kevin K. Johanson; Phillip Earl Hall

[57] ABSTRACT

A communication network (10) includes a constellation of satellites (12) in orbit around the earth. Gateways (14) communicate with the satellites (12), reside on the surface of the earth, and interface the network (10) to the local PSTN (18). User units (16) communicate with satellites (12) and provide communication services to users. A gateway (14) includes a mobile switching center (22), which connects half-calls, and an earth terminal controller (20), which occasionally overrides connections defined in the mobile switching center (22). When possible, communication paths connected at the mobile switching center (22) are intraswitched at one or more satellites (12) rather than being routed through the mobile switching center. However, when supplementary services are requested, the communication path is reconfigured back to the mobile switching center (22) so that additional signals may be inserted into the communication path.

13 Claims, 4 Drawing Sheets

COMMUNICATION METHOD AND NETWORK WITH MULTIPLE DYNAMIC INTRASWITCHING

TECHNICAL FIELD OF THE INVENTION

The present invention relates generally to communication networks. More specifically, the present invention relates to communication networks and methods which provide both basic and supplementary telephony services.

BACKGROUND OF THE INVENTION

A digital cellular radio telecommunication network which incorporates satellite switching centers orbiting the earth faces a dilemma in balancing service quality and service variety against system complexity. Mobile switching centers (MSCs) have been developed to provide a wide range of communication services, including basic and supplementary services, in a terrestrial digital cellular radio telecommunication network and to provide such services at reasonable cost and with reasonable reliability. It would be desirable to incorporate such conventional MSCs into a space-based network to reduce development costs. However, conventional MSCs are relatively complex, ground-based equipment. A space-based network could either sufficiently modify a conventional MSC design to allow the modified MSC to be placed in orbit or route signals propagating in space down to the earth's surface to receive the variety of switching services provided by a conventional MSC.

Placing an MSC in orbit is an undesirable alternative. Placing even a simple satellite in orbit is an expensive undertaking. The large size and weight of a conventional MSC would make an extremely expensive satellite. Moreover, the development effort required to make an MSC withstand a launch and operation in space would further increase costs. In fact, costs could be driven beyond that justified by the demand. Furthermore, complex equipment is more likely to suffer failures than simple equipment. Such complex equipment is better located on the earth where it may be more easily repaired when a failure occurs.

Likewise, placing an MSC on the surface of the earth for use in a space-based network is an undesirable alternative. Signals which travel through a space-based network travel large distances. Propagation delays alone may add many tens of milliseconds delay to communication signals. In addition, various stages of a communication path may add processing delays. Unless care is taken to minimize communication path routing and processing, the combined propagation and processing durations can deteriorate communication service quality by injecting unacceptable delays. Accordingly, the routing of communication signals from a space-based network switching center to the earth to receive the processing and services of an MSC adds a significant and undesirable delay to communication signals, and deteriorates overall service quality.

SUMMARY OF THE INVENTION

Accordingly, it is an advantage of the present invention that an improved communication network and method of operating a communication network are provided.

Another advantage of the present invention is that a communication network incorporates both space-based network switching centers and ground-based network switching centers to provide reasonable service quality with both basic and supplementary communication services.

Another advantage is that the present invention uses intraswitching through a relatively simple space-based network switching center to provide basic service.

Another advantage is that the present invention uses a relatively complex ground-based network switching center to provide supplemental services.

Another advantage is that the present invention reconfigures an existing communication path which does not initially include a ground-based network switching center to include the ground-based network switching center only when supplemental services are requested for the communication path.

The above and other advantages of the present invention are carried out in one form by a method of operating a communication network. The method includes the step of establishing a communication path between first and second user units through a first network switching center but not through a second network switching center. After this communication path is established, the communication path is reconfigured through both the first and second network switching centers.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
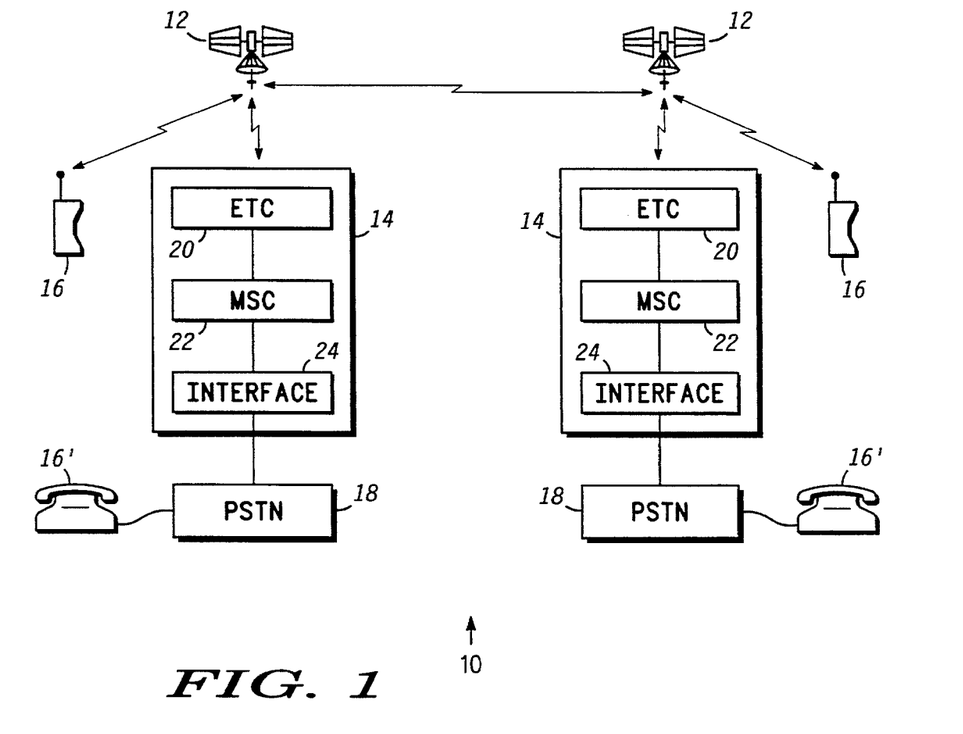
FIG. 1 shows a schematic block diagram of a communication network within which the present invention may be practiced.

FIG. 1 shows a schematic representation of a digital, cellular communication network 10. In the preferred embodiment, network 10 includes satellites (SVs) 12, gateways 14, and user units (UUs) 16. Satellites 12 orbit the earth while gateways 14 and user units 16 reside on or near the earth's surface. Satellites 12 are or may be in radio communication with other satellites 12 that are within range, with gateways 14 within range, and with user units 16 within range.

As presently preferred, sixty-six satellites 12 are arranged in a constellation of eleven, low earth, polar orbits, but this is not a requirement. FIG. 1 shows only two of satellites 12 for convenience. Antennas (not shown) on satellites 12 form patterns projected toward the earth that define cells (not shown) through which cellular communication services are offered to user units 16. Cellular communication services are provided through user units 16 from any point on the earth covered by a cell, and a blanket of cells desirably covers substantially the entire earth. Network 10 may include any number of user units 16.

Likewise, network 10 may include any number of gateways 14. However, network 10 may desirably deploy gateways 14 in accordance with geopolitical jurisdictions and include many fewer gateways 14 than user units 16. Gateways 14 couple network 10 with local public switched telecommunication networks (PSTN) 18 and with a multitude of telephonic devices 16' through PSTN 18. For the purposes of the present invention, such telephonic devices also represent user units (UU) even though they may already serve roles in existing conventional telecommunication networks. In addition, gateways 14 hold and employ a large portion of the intelligence required to operate network 10.

Satellites 12 and gateways 14 are switching centers for network 10. Each switching center receives incoming signals from any of a plurality of origins and switches the incoming signals to any of a plurality of destinations. In the preferred embodiments, these signals may be digital packets which carry signaling or communication data. Signaling data represent messages that control the operation of services provided by network 10. Communication data represent the payload information whose communication is the purpose for network 10. User units 16 and gateways 14 may include vocoders (not shown) to transform analog audio signals into digital packets and vice-versa. Other user units 16 may be configured to communicate pure data or video. While occasionally communicated data packets serve the signaling needs for network 10, a substantially continuous stream of communication data packets are required to support a communication path between user units 16 and/or 16'.

Each gateway 14 includes an earth terminal controller (ETC) 20 which directly communicates with satellites 12. A mobile switching center (MSC) 22 couples to earth terminal controller 20, and a PSTN interface 24 couples to mobile switching center 22. Interface 24 directly communicates with PSTN 18.

In the presently preferred embodiment of the present invention, each mobile switching center 22 is a substantially conventional mobile switching center of the type used in the terrestrial-based Global System for Mobile telecommunications (GSM). Mobile switching centers 22 employ the intelligence needed to make connections between half-calls, where a half-call represents one end, user, or party to a connected call. Such connections are defined in a conventional manner. In addition, mobile switching centers 22 provide both basic and supplementary switching services, again in a conventional manner.

Those skilled in the art will appreciate that basic services are concerned with exchanging information, whether audio, video, or data, between two parties. Supplementary services augment basic services by, for example, allowing a user to participate in multiple connections simultaneously, to suspend information transfer on a connection without disestablishing it, to link other users to the same connection, to redirect connection establishment attempts toward another user or another service, and the like.

When a user unit 16 is within the jurisdiction of a mobile switching center 22, that mobile switching center 22 becomes involved in setting up and managing calls involving the user unit 16. Mobile switching center 22 takes steps to establish a communication path leg to mobile switching center 22 from that user unit 16. This communication path leg corresponds to one half-call of a connection between two half-calls.

When a mobile switching center 22 determines that the other of the two half-calls it is being asked to connect resides within its jurisdiction through PSTN 18, it routes a second communication path leg through interface 24 toward PSTN 18. When mobile switching center 22 determines that the other of the two half-calls does not reside within its jurisdiction through PSTN 18, it routes the second communication path leg through earth terminal controller 20 to satellites 12. In either case, mobile switching center 22 makes a connection between the two communication path legs so that a continuous communication path, at least from the perspective of mobile switching center 22, results. This communication path remains in effect until call termination, at which time mobile switching center 22 tears the communication path down so that the path legs may be used for other calls.

Figure 2:
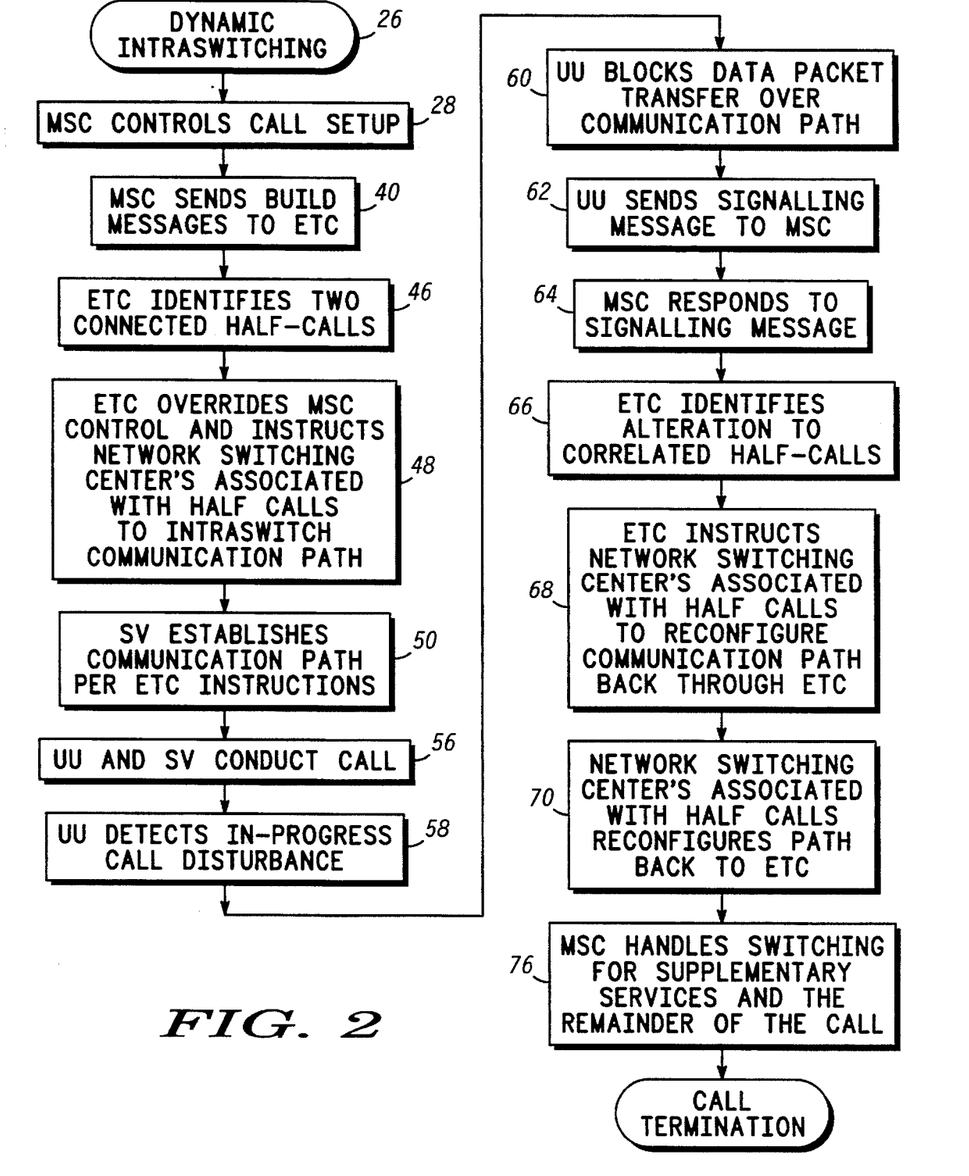
FIG. 2 shows a flow chart of a dynamic intraswitching process performed in accordance with one embodiment of the present invention.

FIG. 2 shows a flow chart of a dynamic intraswitching process 26 performed by network 10 (see FIG. 1). Process 26 includes several tasks which are performed by various ones of user units 16, satellites 12, earth terminal controller 20, and mobile switching controller 22, all of which are discussed above in connection with FIG. 1. User units 16, satellites 12, earth terminal controller 20, and mobile switching center 22 are each computer controlled. Each of these items of equipment desirably includes one or more processors, microprocessors, controllers, and the like which execute programming instructions stored in memories thereof. Those skilled in the art will appreciate that dynamic intraswitching process 26 may be implemented through such programming instructions in a manner well known to those skilled in the art of computer controlled equipment. Those skilled in the art will also understand that each of user units 16, satellites 12, earth terminal controller 20, and mobile switching center 22 performs other tasks which are not relevant to dynamic intraswitching process 26. Such other tasks may include query tasks and other programming mechanisms that evaluate various stimuli or otherwise determine whether to alter the program flow illustrated in FIG. 2. FIGS. 3–6 illustrate the operational states of network 10 at various points in dynamic intraswitching process 26. FIG. 2 and FIGS. 3–6 depict process 26 for only a single user unit (UU) 16, satellite (SV) 12, earth terminal controller (ETC) 20, and mobile switching center (MSC) 22. However, all of such items of equipment within network 10 are preferably configured similarly and preferably perform substantially the same tasks. Thus, process 26 applies throughout network 10, and generalizes to support all combinations of elements, including but not limited to: (1) two UUs 16, each served by different SVs 12 but by the same gateway 14; (2) two UUs 16, each served by the same SV 12 but by different gateways 14; (3) two UUs 16, each served by different SVs 12 and different gateways 14; (4) UU 16 and UU 16' served by the same gateway 14; and (5) UU 16 and UU 16' served by different gateways 14.

Figure 3:
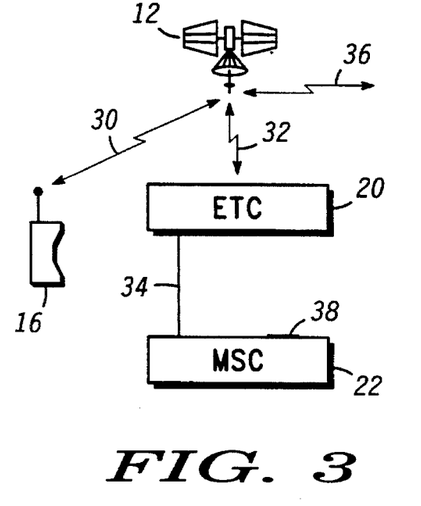
FIG. 3 shows an operational state of the communication network after a first portion of the dynamic intraswitching process.

Referring to FIGS. 2 and 3, process 26 performs a task 28 at mobile switching center (MSC) 22 when a call is being set up between either two user units 16 or a user unit 16 and a user unit 16' (see FIG. 1). In task 28 mobile switching center 22 controls initial stages of call setup in a conventional manner and defines a connection 38 between two half-calls. Call setup involves the sending of various signaling messages over a signaling channel 30 between user unit (UU) 16 and satellite (SV) 12, over a signaling channel 32 between satellite 12 and earth terminal controller (ETC) 20, over a signaling channel 34 between earth terminal controller 20 and mobile switching center 22, possibly over a signaling channel 99 between one ETC 20 and another ETC 20, and over a signaling channel 36 between satellite 12 and other nodes of network 10 (see FIG. 1). During task 28 mobile switching center 22 defines a connection between two half-calls. Channels 30, 32, 34, and 36 represent avenues through which data communications may be exchanged, regardless of how such avenues are implemented. In the preferred embodiment, channels 30, 32, and 36 are radio communication channels through which data packets are sent, and channel 34 is a wired link; channel 99 can be a logical link supported by two channels 32 and one or more channels 36 conjoined.

Figure 4:
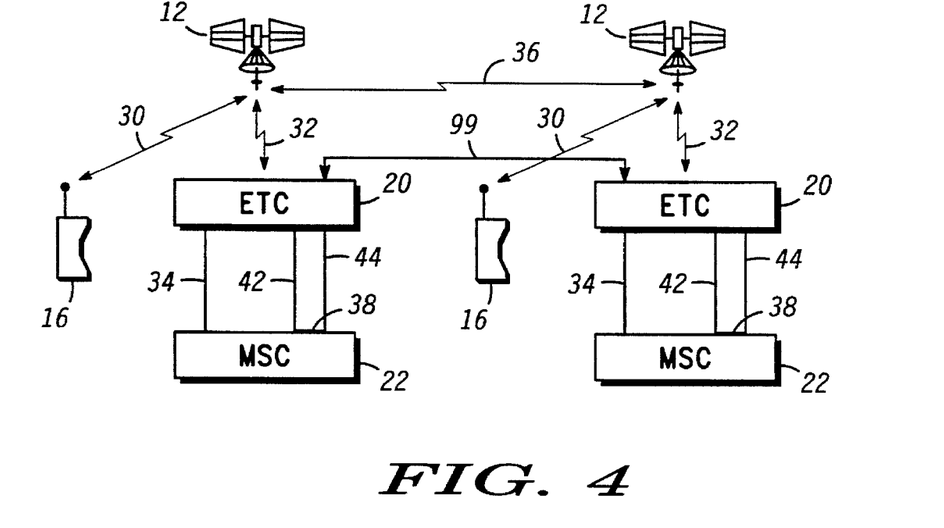
FIG. 4 shows an operational state of the communication network after a second and third portion of the process.

Referring to FIGS. 2 and 4, during a task 40 mobile switching center 22 sends one or more build messages to earth terminal controller 20 over signaling channel 34. Channels 30, 32, and 36 need not be used. The build messages instruct earth terminal controller 20 to allocate the resources of network 10 required to build one or two communication path legs to specified ports of mobile switching center 22; each build message also includes an identifier for the path leg being built. In allocating resources across network 10, ETC 20 also communicates via signaling channels 32 and 99 with SV 12 and other ETC 20, using messages similar to the build messages, to guarantee participation in the path leg by both ends of it.

In the preferred embodiment, signaling channel 34 conforms to the Global System for Mobile telecommunications (GSM) "A" interface; the "build" message is represented by the Base Station Subsystem Management Application Part (BSSMAP) Assignment Request message defined in that standard. In the preferred embodiment, signaling channel 34 also conforms to the ITU standard for interexchange signaling, known as the ISDN User Part and called ISUP; in this case the "build" message is represented either by the Initial Address Message (IAM) defined in that standard, or by a new message (extending that standard) similar to the BSSMAP message cited.

The BSSMAP message is used when the half-call being established includes a UU 16 served by this gateway 14; the ISUP message is used when the half-call being established includes a UU 16 or UU 16' served by some other gateway 14. In both cases, a data item called Circuit Identification Code (CIC) is used to identify the path legs being constructed.

If the two half-calls connected at mobile switching center 22 are routed through earth terminal controller 20, then earth terminal controller 20 receives instructions to construct two communication path legs. If only one of the two half-calls connected at mobile switching center 22 is routed through earth terminal controller 20, then earth terminal controller 20 receives build message instructions to construct only one communication path leg. Dynamic intraswitching process 26 is concerned with the situation where earth terminal controller 20 receives instructions to construct two path legs.

Task 40 defines communication path legs 42 and 44 between earth terminal controller 20 and mobile switching center 22 in response. During either of tasks 28 or 40, mobile switching center 22 may send a correlation signaling message to earth terminal controller 20. The correlation message informs earth terminal controller 20 that the two path legs 42 and 44 are connected in mobile switching center 22. This correlation information is sent in response to the connection defined between two half-calls in task 28, and includes path leg identifiers for these two half-calls.

Next, during a task 46, earth terminal controller 20 identifies two half-calls that are connected in mobile switching center 22 and routed through earth terminal controller 20. When earth terminal controller 20 determines that two of the communication path legs between it and mobile switching center 22 are connected, network 10 may omit mobile switching center 22 from the communication path. Earth terminal controller 20 identifies the connection by evaluating the above-discussed correlation and build messages. Specifically, if the two path leg identifiers in the correlation message match the identifiers of path legs recently built (and not torn down yet), this determination is successful.

Dynamic intraswitching process 26 is concerned with the situation where two half-calls just connected in mobile switching center 22 are routed through earth terminal controller 20. However, if only one half-call is routed through earth terminal controller 20 or if earth terminal controller 20 fails to identify the just-defined connection in mobile switching center 22, earth terminal controller 20 then proceeds to build communication path legs (not shown) out into space to connect the parties identified in the build messages with communication path legs 42 and 44. The call then progresses in a conventional manner. Mobile switching center 22 is included in the communication path for the call, and communicated information flows from satellite 12, through earth terminal controller 20 and mobile switching center 22, and back to satellite 12 (or other ETC 20) in this communication path. In addition, decode and encode operations may be performed in earth terminal controller 20 on the down-link and up-link, respectively, to translate digital communication data in network 10 into analog data, and vice-versa. From the perspective of earth terminal controller 20 communication path legs for the two half-calls might as well be used in separate calls.

After task 46 network 10 performs a task 48. In task 48 earth terminal controller 20 overrides the build instructions it received from mobile switching center 22 (and translated to SV 12 or other ETC 20). Task 48 is performed when earth terminal controller 20 identifies two half-calls just connected in mobile switching center 22 as being routed through it. Rather than take actions which will actually route the two half-calls in this manner, earth terminal controller 20 instructs satellite 12 (or other ETC 20) to intraswitch the communication path for the two half-calls. Intraswitching refers to switching a communication path at a switching center which is remotely located from the place where the switching connection is defined. Earth terminal controller 20 defines a connection as being the two path legs involved in the identified connection. The intraswitching instructions are communicated via signaling messages passed over channels 32 and 99, using a message called redirect. Note that other ETC 20 is likely performing these same steps. If it has completed its own task 48, then it will forward the redirect message to the SV 12 or other ETC 20 also participating in its intraswitched connection; if it has not yet completed its own task 48, it will obey the redirect itself. Those skilled in the art will recognize that these rules allow arbitrarily complex path leg chains to be intraswitched optimally, using very simple procedures distributed throughout network 10.

Figure 5:
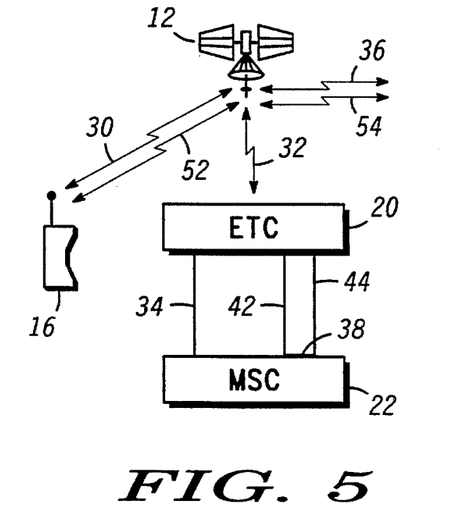
FIG. 5 shows an operational state of the communication network after a fourth and fifth portion of the process.

Referring to FIGS. 2 and 5, after task 48 network 10 performs a task 50. In task 50 satellite (SV) 12 establishes a communication path as instructed by earth terminal controller 20. This communication path is formed by communicating signaling messages over channels 30 and 36 to user unit 16 and other nodes in network 10. In response to such signaling, a communication path leg 52 forms between user unit 16 and satellite 12, and a communication path leg 54 forms between satellite 12 and other nodes in network 10. The communication path between user unit 16 and another user unit 16 or 16' (see FIG. 1) includes the network switching center provided by satellite 12 but does not include the network switching center provided by mobile switching center 22.

After task 50, the call has been set up and communication service may commence. User unit 16 and satellite 12 conduct the call without involvement from mobile switching center 22, as indicated in task 56. At this point, network 10 provides basic service to the call. Each of two user units 16 or 16' inserts information into the communication path defined between the two user units through network 10.

The communication path remains in space as far as possible due to the intraswitching performed by satellite 12. Since the communication path is not actually routed through the mobile switching center(s) 22 that connected the call, delays associated with routing communication data from satellite 12 to earth terminal controller 20, decoding digital data into an analog signal, routing the analog signal through mobile switching center 22, encoding the analog signal back into digital data in earth terminal controller 20, and routing the communication data back to satellite 12 are omitted. This omission of signal delay improves service quality. In addition, the decoding of digital data into an analog form and then encoding the analog form back into digital data would further degrade signal quality, and the intraswitching performed in satellite(s) 12 avoids such further degradation.

Even though mobile switching center 22 is not included in the communication path, it is still in signaling communication with user unit 16 and any other node of network 10 through communication links 32 and 34. However, while basic service takes place, these channels need not convey signaling messages.

The vast majority of communication services provided by network 10 are typically basic services. Thus, the intraswitching in satellite(s) 12 vastly improves service quality for overall communication services in network 10. Moreover, conventional mobile switching centers 22 may be utilized in network 10 and located on the earth's surface. Satellites 12 are relatively simple network switching centers while mobile switching centers 22 may include the more complicated intelligence which connects half-calls.

However, users of telephony services are accustomed to having supplementary services at their disposal even though supplementary services are used much less frequently than basic service. Process 26 is a dynamic intraswitching process because it may reconfigure an intraswitched communication path when certain supplementary services are required. The types of supplementary services which cause reconfiguration of the communication path are desirably those that require other signals to be inserted in the communication path, such as multi-party connections and the like.

In particular, a user unit 16 in network 10 performs a task 58 when it detects a disturbance in the in-progress call. The disturbance may be an on-hook indication which signals that the user unit 16 is terminating the call. Alternatively, the disturbance may be a hold indication which signals that a supplementary service is being or is about to be requested. The disturbance typically results from a user manipulating a switch (not shown) on user unit 16.

Referring to FIGS. 2 and 5, in response to the detection of the disturbance, user unit 16 blocks data packet transfer over the communication path, as indicated at task 60. At this point, the call is still being conducted and communication path legs 52 and 54 remain active. However, user unit 16 refrains from sending data packets that might communicate only silence. This allows network 10 to conserve its spectrum and resources by omitting unnecessary data packet traffic, such as data packets that convey silence. Consequently, capacity may be available to carry other data packets that convey worthwhile information. In addition, user unit 16 prevents the presentation of information to a user which may be received over the communication path.

As shown at a task 62, user unit 16 next sends a signaling message to mobile switching center 22 in response to the detected in-progress call disturbance. The signaling message informs mobile switching center 22 of the disturbance. The signaling message is routed to mobile switching center 22 over signaling channels 30, 32, and 34.

Tasks 58, 60, and 62 are performed when a user unit 16 disturbs an in-progress call. However, an in-progress call may alternatively be disturbed by a user unit 16' (see FIG. 1). In this situation tasks 58, 60, and 62 may be omitted.

Mobile switching center 22 responds when it receives the signaling message, as indicated in a task 64. This signaling message may have originated from a user unit 16 operating as described above in connection with tasks 58, 60, and 62, or it may originate from a user unit 16' (see FIG. 1). The appropriate response will depend upon the nature of the disturbance communicated to mobile switching center 22. For example, if the disturbance results from going on-hook, mobile switching center 22 responds by informing other network nodes involved in the call and by taking steps to knock down the communication path. Such steps will involve the communication of "clear path" signaling messages to earth terminal controller 20 which identify the communication path legs to de-allocate. Earth terminal controller 20 responds to such messages by de-allocating the communication path and by dissolving the corresponding connection identified above in task 46. Note that in the preferred embodiment, these "clear path" messages are represented by appropriate GSM (Clear) and ISUP (Release) messages, as previously discussed. If the disturbance results from a hold, mobile switching center 22 sends a message signaling the hold condition to the opposite party. Such a message may be communicated over channels 32 and 36.

The response mobile switching center 22 makes to the signaling message may include responses to other signaling messages received from user unit 16. For example, when multi-party calls, call transfer, and other supplementary services are requested, mobile switching center 22 may control another call setup, substantially as discussed above in connection with tasks 28 and 40.

Next, earth terminal controller 20 performs a task 66, in which an alteration is identified in a connection between previously correlated half-calls. For example, in the case of a multi-party call a connection between parties A and B may have been detected and a communication path for this connection intraswitched at satellite 12. If party A disturbs the call by placing party B on hold and then calls a party C, earth terminal controller 20 detects another A-related connection which represents an alteration of its previously identified A-B connection. This detection is accomplished by matching the path leg identifiers in the correlation message against the identifiers of existing path legs previously correlated.

When earth terminal controller 20 identifies an alteration to a previously identified connection, earth terminal controller 20 performs a task 68. During task 68 earth terminal controller 20 instructs satellite(s) 12 or other ETC(s) 20 to reconfigure the intraswitched communication path back through earth terminal controller 20 to mobile switching center 22. This instruction is accomplished by sending one or more reconfiguration messages through signaling channel 32. The reconfiguration messages identify the two parties who are connected through intraswitching at satellite(s) 12 or other ETC(s) 20, and whose connection is being altered, and they instruct satellite(s) 12 or other ETC(s) 20 to route communication paths to earth terminal controller 20. Note that reconfiguration instructions may be structured so as to be essentially identical to intraswitching instructions, and so they are implemented in the preferred embodiment using the same message, called redirect.

Figure 6:
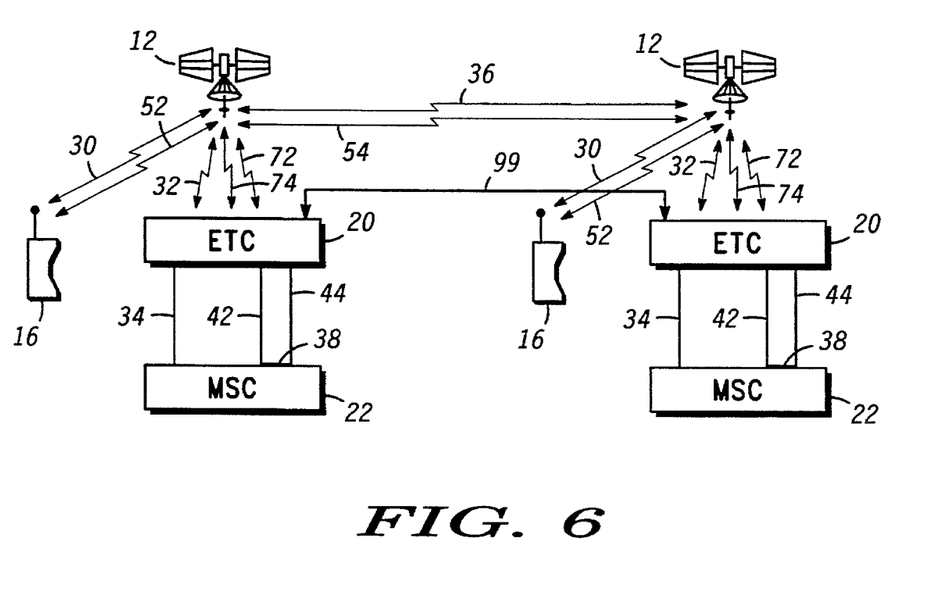
FIG. 6 shows an operational state of the communication network after a sixth and seventh portion of the process.

Referring to FIGS. 2 (step 70) and 6, satellite(s) 12 or other ETC(s) 20 respond(s) to the reconfigure message by reconfiguring communication paths for the call so that the communication path legs 52 and 54 are not connected together in satellite(s) 12 or other ETC(s) 20. Instead, communication path leg 52 is connected to a newly allocated communication path leg 72 between satellite 12 or other ETC 20 and earth terminal controller 20, and communication path leg 54 is connected to a newly allocated communication path leg 74 between satellite 12 or other ETC 20 and earth terminal controller 20. At this point, intraswitching for the call has been dissolved, and mobile switching center 22 performs the connection function between the two half-calls. Note that the same rules as cited previously in task 48 for ETCs 20 to forward or process redirect messages apply here as well. This allows connections involving multiple gateways 14 to be either intraswitched around or reconfigured through each gateway 14 as required by the services in effect for the user unit 16 served at that gateway 14. Therefore, those connection segments which can be optimally intraswitched will be; only those segments which must be reconfigured due to supplementary services will be connected through an MSC 22 at a gateway 14.

Task 76 takes place at mobile switching center 22 following task 70. During task 76, mobile switching center 22 handles switching for supplementary services and for the remainder of the call. Mobile switching center 22 operates on analog signals and may easily inject additional signals into the connection as required by requested supplementary services. In the presently preferred embodiment, the communication path is not routed away from mobile switching center 22 later even if the call reverts to basic service. Thus, the communication path continues to pass through mobile switching center 22 until call termination. However, nothing prevents such reversion to intraswitching in other embodiments.

By pulling the intraswitched communication path back into mobile switching center 22, supplementary services may be added to the call. Such supplementary services may insert into the communication path signals other than those provided by the original two user units 16 or 16' involved in the call. When the communication path is pulled back into mobile switching center 22, the communication path lengthens and signal delay increases. However, the reconfiguration of an intraswitched communication path desirably occurs in connection with supplementary services that insert additional signals into the communication path. Such supplementary services make up only a small portion of the overall communication services provided by network 10. Consequently, the overall effect of extending the communication path for only a small portion of the communication services provided has a minimal effect on the overall quality of services provided by network 10.

In summary, the present invention provides an improved communication network and method of operating a communication network. A communication network incorporates both space-based network switching centers and ground-based network switching centers to provide reasonable service quality with both basic and supplementary communication services. The present invention uses intraswitching through a relatively simple space-based network switching center to provide basic service. A more complex ground-based network switching center provides supplemental services when they are needed. An existing communication path which provides basic service and does not include a ground-based network switching center is reconfigured to include the ground-based network switching center when supplemental services are requested for the communication path.

The present invention has been described above with reference to preferred embodiments. However, those skilled in the art will recognize that changes and modifications may be made in these preferred embodiments without departing from the scope of the present invention. For example, the dynamic intraswitching process described herein is not limited to use merely in connection with space-based networks or with conventional mobile switching centers. These and other changes and modifications which are obvious to those skilled in the art are intended to be included within the scope of the present invention.

What is claimed is:

1. A method of operating a communication network comprising the steps of:

establishing a communication path between first and second user units through a network of N switching centers, where N is greater than 1:

intraswitching, after said establishing step, said communication path through X switching centers, where X is less than N;

said first and second user units inserting first and second respective signals in said communication path;

inserting a signaling message in said communication path to convey a request from said first user unit for supplementary services;

receiving said signaling message conveying said request from said first user unit; and reconfiguring said communication path between said first and second user units through M switching centers, where M is greater than X and M is less than or equal to N.

2. A method as claimed in claim 1 additionally comprising the step of conducting a call between said first and second user units during said reconfiguring step.

3. A method as claimed in claim 1, said intraswitching step additionally comprising the step of determining, at one of said N switching centers whether said communication path can omit one of the said N switching centers, and wherein the intraswitching step is performed in response to the step of determining.

4. A method as claimed in claim 1 additionally comprising the steps of:

sending data packets through said communication path, said sending step taking place at said first user unit;

detecting, at said first user unit, an instruction to implement a hold service; and refraining, in response to said detecting step, from sending data packets through said communication path.

5. A method as claimed in claim 1 additionally comprising the steps of:

receiving data packets from said communication path, said receiving step taking place at said first user unit;

converting said data packets into audio signals;

detecting, at said first user unit, an instruction to implement a hold service; and refraining, in response to said detecting step, from converting received data packets into audio signals.

6. A method as claimed in claim 1 additionally comprising the step of determining in one of said N switching centers the need to reconfigure in response to said signaling message received from said first user.

7. A method as claimed in claim 1, said intraswitching step additionally comprising the step of determining in at least one of said N switching centers the need to intraswitch when said N switching centers are involved in said communication path.

8. A method of operating a communication network having N switching centers comprising the steps of:

locating at least one of the N switching centers in orbit about the earth;

locating at least of one of N switching centers proximate the surface of the earth;

establishing a communication path between first and second user units through N switching centers, where N is greater than 1;

intraswitching, after said establishing step, said communication path through X switching centers, where X is less than N;

said first and second user units inserting first and second respective signals in said communication path;

inserting a signaling message in said communication path to convey a request from said first user unit for supplementary services;

receiving said signaling message at one of said X switching centers; and reconfiguring said communication path between first and second user units through M network switching centers, where M is greater than X and M is less than or equal to N.

9. A method as claimed in claim 8 additionally comprising the step of conducting a call between said first and second user units during said reconfiguring step.

10. A method as claimed in claim 8 additionally comprising the step of receiving said signaling message from said first user unit so that said reconfiguring step occurs in response to said signaling message.

11. A communication network comprising:

first and second user units, said first and second user units inserting first and second respective signals in a communication path, said first unit also inserting a signaling message in said communication path to convey a request for supplementary services;

a first network switching center forming at least a portion of a data communication path between said first and second user units;

a second network switching center in signaling communication with said first user unit, said second network switching center receiving said signaling message from said first user unit, said communication path being intraswitched between said first and second user units; and means for reconfiguring said data communication path through said first and second network switching centers in response to said signaling message received at said second network switching center from said first user unit.

12. A communication network as claimed in claim 11 wherein said second network switching center comprises at least one Global System for Mobile telecommunications (GSM) Mobile Switching Center (MSC).

13. A communication network as claimed in claim 11 wherein said first network switching center comprises at least one satellite located in orbit around the earth.

* * * * *